United States Patent [19]
Henderson

[11] 3,760,230
[45] Sept. 18, 1973

[54] HIGH SPEED AC FAILURE DETECTOR CIRCUIT

[75] Inventor: Ross Henderson, North Reading, Mass.

[73] Assignee: Gould Inc., Mendota Heights, Minn.

[22] Filed: Nov. 9, 1972

[21] Appl. No.: 304,996

[52] U.S. Cl. ............... 317/27 R, 307/64, 317/33 R
[51] Int. Cl. ............................................. H02h 3/26
[58] Field of Search ........................ 317/27 R, 33 R; 324/83 R; 307/64

[56] References Cited
UNITED STATES PATENTS
| | | | |
|---|---|---|---|
| 3,201,592 | 8/1965 | Reinert et al. ..................... | 307/64 |
| 3,337,742 | 8/1967 | Baehr et al. ........................ | 307/64 |
| 3,409,783 | 11/1968 | Raehr et al. ....................... | 307/64 |

*Primary Examiner*—James D. Trammell
*Attorney*—Daniel Jay Tick

[57] ABSTRACT

A high speed AC failure detector circuit for detecting an AC power failure and producing an output signal upon the occurrence of such failure comprises an integrator circuit having an input and an output. The output of the integrator circuit is connected to the input of the integrator circuit in a manner whereby there is a 180° phase shift between the input and the output. A signal input is connected to the input of the integrator circuit. A potentiometer is connected between the input and the output of the integrator circuit. When a continuous AC signal is supplied to the signal input the resultant signal at the potentiometer is zero due to the 180° phase shift between the input and the output of second integrator circuit. When a discontinuity appears in an AC signal supplied to the signal input the resultant signal at the potentiometer is a sine wave. An output connected to the potentiometer fails to produce an output signal when the resultant signal at the potentiometer is zero and produces an output signal when the resultant signal at the potentiometer is other than zero.

7 Claims, 1 Drawing Figure

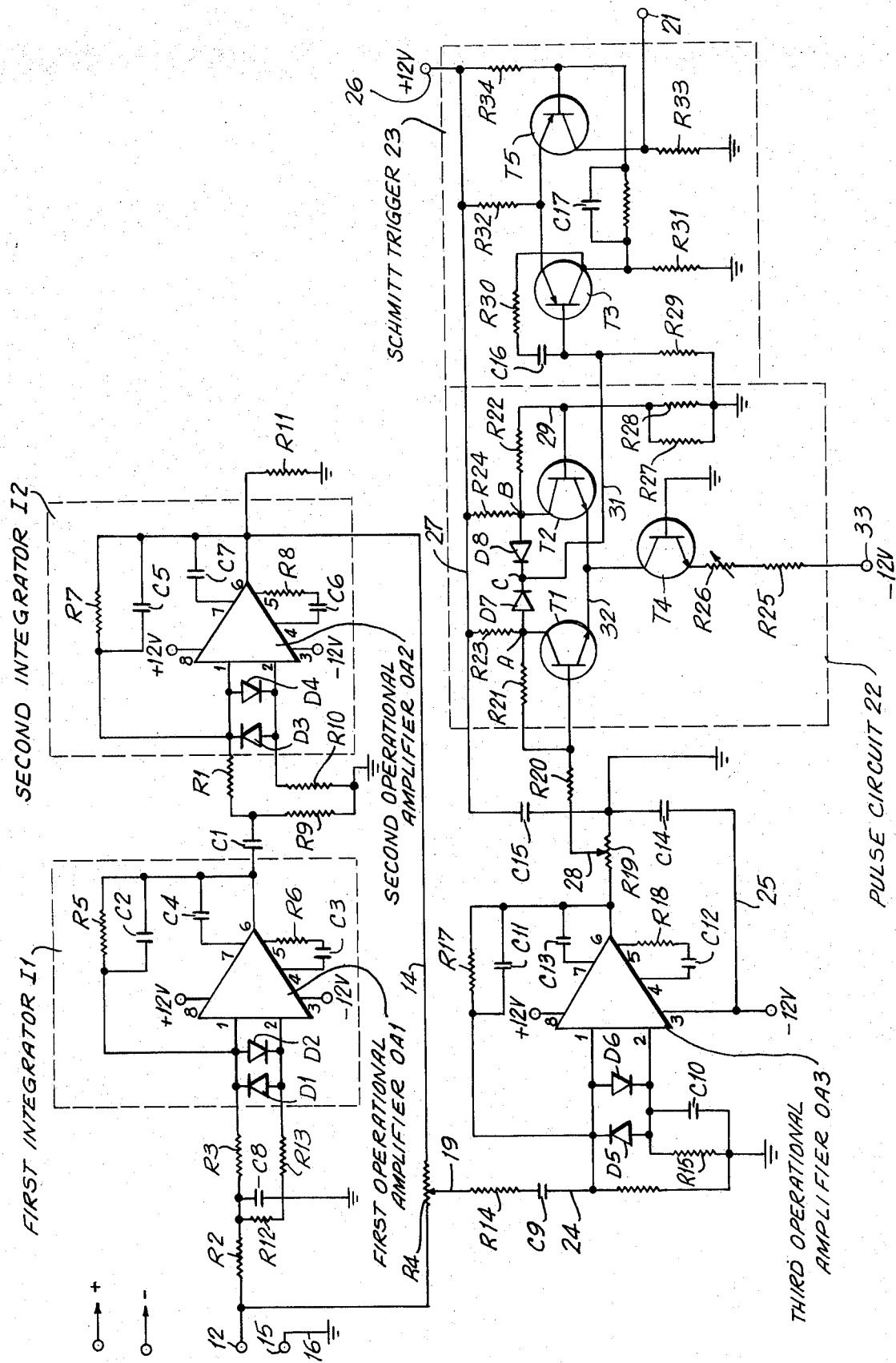

3,760,230

HIGH SPEED AC FAILURE DETECTOR CIRCUIT

BACKGROUND OF THE INVENTION:

The present invention relates to a high speed AC failure detector circuit.

AC failure detector circuits are utilized to determine when commercial AC power fails. Known AC failure detector circuits accomplish this by utilizing an ordinary relay having contacts which open when the solenoid armature drops out. Known AC failure detector circuits may also utilize some type of Schmitt trigger circuit which operates either a static device or a static device in conjunction with an electromechanical relay which determines the failure of the AC. The known failure detector circuits are extremely slow when speed in detection is of the essence. This is especially so in high speed static switching systems in which it is necessary to detect a failure rapidly and to transfer the load from the failing AC source to a standby power source.

It is necessary, in power failure detection, to cover all contingencies. In many known systems for power failure detection, the square wave section is searched for and if such square wave section is present, it is assumed that the power source is operating properly. If the square wave section is not present, it is assumed that there is a power failure.

There is thus a great need for a high speed detector which will detect an impending power failure and transfer the load to an alternate source of power.

The principal object of the invention is to provide a high speed AC failure detector circuit of simple structure which detects an AC power failure in less than a millisecond.

An object of the invention is to provide a high speed AC failure detector circuit which produces a warning signal substantially simultaneously with the occurrence of a failure in an input sine wave.

Another object of the invention is to provide a high speed AC failure detector circuit which produces a warning signal within approximately 5 to 10 microseconds of the time of occurrence of an AC power failure, which time lapse is insignificant when 15 or 20 kilovoltamperes of power switching is involved.

Still another object of the invention is to provide a high speed AC failure detector circuit which detects the failure of a capacitor of a ferroresonant transformer and in the output of some types of inverters.

Yet another object of the invention is to provide a high speed AC failure detector circuit which may be connected to the output of a ferroresonant transformer in which capacitors are connected to detect the failure or impending failure of a capacitor and commutate that part of the system and switch it to an alternate source of power.

Another object of the invention is to provide a high speed AC failure detector circuit which detects positive and negative discontinuities in a sine wave, so that the discontinuity may be picked up at the point of failure.

Another object of the invention is to provide a high speed AC failure detector circuit which may be utilized in any electromechanical transfer system.

Yet another object of the invention is to provide a high speed AC failure detector circuit which functions efficiently, effectively and reliably.

BRIEF SUMMARY OF THE INVENTION

In accordance with the invention, a high speed AC failure detector circuit which detects an AC power failure and produces an output signal upon the occurrence of such failure comprises an integrator circuit having an input and an output connected to the input in a manner whereby there is a 180° phase shift between the input and the output. A signal input is connected to the input of the integrator circuit. A potentiometer is connected between the input and the output of the integrator circuit whereby when a continuous AC signal is supplied to the signal input, the resultant signal at the potentiometer is zero due to the 180° phase shift between the input and the output of the integrator circuit. When a discontinuity appears in an AC signal supplied to the signal input the resultant signal of the potentiometer is a sine wave. An output connected to the potentiometer fails to produce an output signal when the resultant signal at the potentiometer is zero and produces an output signal when the resultant signal at the potentiometer is other than zero.

The integrator circuit comprises first and second integrators each having an input and an output. The output of the first integrator is connected to the input of the second integrator. The potentiometer is connected between the input of the first integrator and the output of the second integrator.

Each of the first and second integrators comprises an operational amplifier.

The output comprises an amplifier having an input connected to the potentiometer and an output. A pulse circuit is connected to the output of the amplifier whereby when the resultant signal at the potentiometer is other than zero the amplifier produces an output signal pulse of either polarity. The pulse circuit converts the output signal pulse to a positive pulse of a predetermined level. The amplifier preferably comprises an operational amplifier.

The potentiometer comprises a variable resistor having one end connected to the input of the first integrator and another end connected to the output of the second integrator. The variable resistor has a movable contact tap connected to the input of the amplifier.

A Schmitt trigger circuit has an input connected to the output of the amplifier and converts the positive pulses produced by the amplifier to square wave pulses.

BRIEF DESCRIPTION OF THE DRAWING

In order that the invention may be readily carried into effect, it will now be described with reference to the accompanying drawing, wherein the single FIGURE is a circuit diagram of an embodiment of the high speed AC failure detector circuit of the invention.

DETAILED DESCRIPTION OF THE INVENTION

The high speed AC failure detector circuit of the invention comprises a first integrator I1 including a first operational amplifier OA1. The first operational amplifier OA1 has a plurality of leads or pins 1, 2, 3, 4, 5, 6, 7 and 8. The input of the first operational amplifier OA1 is supplied between the leads or pins 1 and 2. The output is derived at the pin or lead 6. The basic DC voltage is applied between the leads 3 and 8.

The output lead or pin 6 of the first operational amplifier OA1 is connected to the input leads or pins 1 and 2 of a second operational amplifier OA2 of a second integrator I2 via an electrically conductive lead 11 and a capacitor C1 and resistor R1 connected in series in said electrically conductive lead. The second operational amplifier OA2 is identical to the first operational amplifier OA1 and has the same pins or leads 1 to 8 having the same functions.

A third operational amplifier OA3, hereinafter described, is identical to each of the first and second operational amplifiers OA1 and OA2 and has the same pins or leads 1 to 8 having the same functions. An operational amplifier is an amplifier. The amplification factor of an operational amplifier is in the order of tens of thousands and varies from 10,000 to 200,000 or greater. The gain is very precise and is a function of the resistors in its feedback circuit. Operational amplifiers are described, for example in the "Handbook of Operational Amplifier Active RC Networks," by the Applications Engineering Section of Burr-Brown Research Corporation, 1966, and in the Fairchild Semiconductor Data Catalog, by Fairchild Semiconductor 1968, pages 6–100 to 6–104.

The input AC power or sine waves are supplied to the detector circuit of the invention via an input comprising an input terminal 12 connected to the input lead or pin 1 of the first operational amplifier OA1 via a pair of resistors R2 and R3 connected in series between the input terminal 12 and the pin 1 in an electrically conductive lead 13. The input terminal 12 is connected to the output pin 6 of the second operational amplifier OA2 via a variable resistor R4 connected in an electrically conductive lead 14. The input includes a second input terminal 15 connected to a point at ground potential via a lead 16.

Each of the first and second operational amplifiers is connected as an integrator. The first operational amplifier OA1 has a gain setting resistor R5 connected between its output pin 6 and its input pin 1. An integrator capacitor C2 is connected in shunt with the resistor R5 between the pins 6 and 1. A high frequency compensating capacitor C3 is connected in series with a high frequency compensating resistor R6 between the pins 4 and 5 of the first operational amplifier OA1. A high frequency compensating capacitor C4 is connected between the pins 6 and 7 of the first operational amplifier OA1. A pair of diodes D1 and D2 are connected in parallel with inverse polarities between the input pins 1 and 2 of the first operational amplifier OA1.

The second operational amplifier OA2 has a gain setting resistor R7 connected between its output pin 6 and its input pin 1. An integrator capacitor C5 is connected in shunt with the resistor R7 between the pins 6 and 1. A high frequency compensating capacitor C6 is connected in series with a high frequency compensating resistor R8 between the pins 4 and 5 of the second operational amplifier OA2. A high frequency compensating capacitor C7 is connected between the pins 6 and 7 of the second operational amplifier OA2. A pair of diodes D3 and D4 are connected in parallel with inverse polarities between the pins 1 and 2 of the second operational amplifier OA2.

The output pin 6 of the first operational amplifier OA1 is connected to a point at ground potential via a resistor R9. The input pin 2 of the second operational amplifier OA2 is connected to a point at ground potential via a resistor R10. The output pin 6 of the second operational amplifier OA2 is connected to a point at ground potential via a resistor R11. A compensating circuit comprising a capacitor C8 and a resistor R12 connected in parallel therewith is connected between a common point in the connection between the resistors R2 and R3 and a point at ground potential. The input pin 2 of the first operational amplifier OA1 is connected to a point at ground potential via a resistor R13.

The interconnection of the first and second integrators 11 and 12 provides a 180° phase shift between the input of the first integrator and the output of the second integrator. Thus, when an AC signal is supplied to the input terminals 12 and 15, the resultant signal at the variable resistor R4 is zero when the input signal is a continuous sine wave. The gain of the first and second operational amplifiers OA1 and OA2 is set to unity or as close to unity as possible. Thus, the variable resistor R4, functions as a nulling potentiometer due to the 180° phase shift between the first and second integrators I1 and I2. It is therefore of no consequence if there is a slight attenuation through both operational amplifiers OA1 and OA2 functioning as a unit.

A pair of additional input terminals 17 and 18 are provided for applying the basic DC voltage from a DC voltage source of 12 volts (not shown in the FIGURE) to the pins 3 and 8 of the first and second operational amplifiers OA1 and OA2. The additional input terminals 17 and 18 also provide the basic DC voltage for the pins 3 and 8 of the third operational amplifier OA3, hereinafter described.

When a discontinuity appears in an AC signal or sine wave supplied to the input terminals 12 and 15, the resultant signal at one end of the input potentiometer or variable resistor R4 is a sine wave. This is due to the fact that the first and second integrators I1 and I2 essentially eliminate the discontinuity and produce a substantially pure sine wave at the right hand end of the variable resistor R4. The discontinuity remains, however, at the left hand end of the variable resistor R4.

The variable resistor R4 has a movable contact tap 19. An output circuit is connected to the movable contact tap 19 of the variable resistor R4. The output circuit fails to produce an output signal at an output terminal 21 when the resultant signal at the variable resistor R4 is zero and produces an output signal at said output terminal when the resultant signal at said variable resistor is other than zero.

The output circuit comprises the third operational amplifier OA3 having its input pins connected to the movable contact tap 19 of the variable resistor R4 and its output pin connected to the input of a pulse circuit 22. The output of the pulse circuit 22 is connected to the output terminal 21 via Schmitt trigger circuit 23.

The movable contact tap of the variable resistor R4 is connected to the pin 1 of the third operational amplifier OA3 via a resistor R14 and a capacitor C9 connected in series in an electrically conductive lead 24. The input pin 2 of the third operational amplifier OA3 is connected to one terminal of a compensating network comprising a capacitor C10 and a resistor R15 connected in parallel with each other. The other terminal of the compensating network R15, C10 is connected to a point at ground potential and is also connected to a common point in the connection between the capacitor C9 and the input pin 1 of the third operational amplifier OA3 via a resistor R16. A pair of diodes D5 and D6 are connected in parallel with inverse polarities between the input pins 1 and 2 of the third operational amplifier OA3.

The third operational amplifier OA3 has a gain setting resistor R17 connected between its output pin 6 and its input pin 1. An integrator capacitor C11 is connected in shunt with the resistor R17 between the pins 6 and 1. A high frequency compensating capacitor C12 is connected in series with a high frequency compensating resistor R18 between the pins 4 and 5 of the third operational amplifier OA3. A high frequency compensating capacitor C13 is connected between the pins 6 and 7 of the third operational amplifier OA3.

The output pin 6 of the third operational amplifier OA3 is connected to the pin 3 thereof via a variable resisotr R19 and a capacitor C14 connected in series in an electrically conductive lead 25. A common point in the connection between the variable resistor R19 and the capacitor C14 is connected to a point at ground potential and is also connected to a bias voltage terminal 26 via a capacitor C15 and a lead 27. The input terminal 17 is connected to and applies a voltage of +12 volts to the terminal 26.

The variable resistor R19 has a movable contact tap 28. The movable contact tap 28 of the variable resistor R19 is connected to the base electrode of a transistor T1 of the pulse circuit 22 via a resistor R20. The base electrode of the transistor T1 is connected to the base electrode of a transistor T2 via a resistor R21, a diode D7, a diode D8 and a resistor R22, connected in series in an electrically conductive lead 29. The diodes D7 and D8 are connected with their cathodes in common connection.

The collector electrode of the transistor T1 is connected to the bias voltage terminal 26 via a collector resistor R23 and the lead 27. The collector electrode of the transistor T2 is connected to the bias voltage terminal 26 via a collector resistor R24 and the lead 27. The diodes D7 and D8 are connected between the collector electrodes of the transistors T1 and T2. A common point in the connection between the diodes D7 and D8 is connected to the base electrode of a transistor T3 of the Schmitt trigger circuit 23 via an electrically conductive lead 31.

The resistor R21 is connected between the base and collector electrodes of the transistor T1. The resistor R22 is connected between the base and collector electrodes of the transistor T2. The emitter electrodes of the transistors T1 and T2 are connected to each other via an electrically conductive lead 32. The collector electrode of a transistor T4 is connected to the lead 32. The base electrode of the transistor T4 is connected to a point at ground potential. The additional input electrode 18 is connected to and applies a DC bias voltage of −12 volts to a terminal 33 of the pulse circuit. The terminal 33 is connected to the emitter electrode of the transistor T4 via a resistor R25 and a variable resistor R26 connected in series. The base electrode of the transistor T2 of the pulse circuit 22 is connected to a point at ground potential via a pair of resistors R27 and R28 connected in parallel with each other.

The output of the third operational amplifier OA3 is either a positive pulse or a negative pulse. The pulse circuit 22 functions to convert the output pulse of the third operational amplifier to a positive pulse of a predetermined level, regardless of the polarity of said output pulse. In the quiescent state of the pulse circuit 22, the potentials at circuit points A and B are equal, so that the potential at a circuit C therebetween is zero. If the output of the third operational amplifier OA3 is a positive pulse, the transistor T1 becomes more conductive and lowers the potential at the circuit point A.

This upsets the balance of the potentials at the circuit points A and B and results in a positive potential at the circuit point C, so that a positive pulse appears in the lead 31.

If the output of the third operational amplifier OA3 is a negative pulse, the transistor T1 becomes less conductive and increases the potential at the circuit point A. This upsets the balance of the potentials at the circuit points A and B and results in a positive potential at the circuit point C, so that a positive pulse appears in the lead 31. The transistor T2 functions to provide a reference potential at the circuit point B. The transistor T4 functions to provide the proper current for the aforedescribed operation.

A Schmitt trigger circuit is described and shown in "Computer Basics," Volume 6, entitled "Solid-State Computer Circuits" by Technical Education and Management, Inc., Howard W. Sams & Co., Inc., The Bobbs-Merrill Company, Inc., Indianapolis and New York, First Edition, 1962. The Schmitt trigger circuit 22 is well known, in structure and operation.

The base electrode of the transistor T3 of the Schmitt trigger circuit 23 is connected to a point at ground potential via a resistor R29. The transistor T3 has a feedback path comprising a resistor R30 and a capacitor C16. The collector electrode of the transistor T3 is connected to a point at ground potential via a resistor R31. The emitter electrode of the transistor T3 is connected to the emitter electrode of a transistor T5 of the Schmitt trigger circuit 23 via an electrically conductive lead 34.

An emitter resistor R32 is connected between the lead 34 and the bias voltage terminal 26 via the lead 27. The collector electrode of the transistor T5 is connected to a point at ground potential via a resistor R33. The base electrode of the transistor T5 is connected to the bias voltage terminal 26 via a base resistor R34. The collector electrode of the transistor T3 is connected to the base electrode of the transistor T5 via a resistor R35. A capacitor C17 is connected in shunt with the resistor R35. The output terminal 21 is connected to the collector electrode of the transistor T5.

The Schmitt trigger circuit 23 functions in a known manner to shape the positive pulse output of the pulse circuit 22 to a square wave pulse.

When a continuous AC signal or sine wave is supplied to the input terminals 12 and 15, there is no signal at the resistor R14 and capacitor C9 and there is thus no output signal of the third operational amplifier OA3 at the resistor R19. Consequently, the transistors T1 and T2 of the pulse circuit 22 are balanced and there is no signal supplied to the base electrode of the transistor T3 of the Schmitt trigger circuit 23. When no signal is supplied to the base electrode of the transistor T3, said transistor is in its conductive condition or ON and the transistor T5 is in its non-conductive condition or OFF. There is thus a zero output signal at the output terminal 21.

When there is a discontinuity in the AC signal or sine wave supplied to the input terminals 12 and 15, the combined first and second integrators I1 and I2 essentially eliminate such discontinuity and provide a substantially pure sine wave at the right hand end of the potentiometer R4, as hereinbefore described, although there is a discontinuity in the signal at the left hand end of said potentiometer. This produces a signal at the end of the R14, C9 network connected to the movable contact tap 19. The signal at the R14, C9 network upsets the operational amplifier OA3 from its steady state condition. The third operational amplifier then produces a positive or negative signal at its output pin 6, which output signal appears across the variable resistor R19. The polarity of the output signal of the third operational amplifier depends upon the polarity of the signal supplied to its input pins 1 and 2.

When the third operational amplifier OA3 produces an output signal, said signal upsets the stable condition of the pulse circuit 22. The upsetting or unbalancing of the pulse circuit 22 creates an unbalance in the conductive conditions of the transistors T1 and T2 of said pulse circuit. This results in a positive signal being applied to the base electrode of the transistor T3 of the Schmitt trigger circuit 23, so that said transistor is switched to its non-conductive or OFF condition. When the transistor T3 is switched OFF, the transistor T5 is switched ON, so that an output pulse is produced at the resistor R33 and is provided at the output terminal 21. The output pulse or signal provided at the output terminal 21 may be utilized to actuate any suitable circuitry or alarm device to indicate a discontinuity in the input AC signal.

While the invention has been described by means of a specific example and in a specific embodiment, I do not wish to be limited thereto, for obvious modifications will occur to those skilled in the art without departing from the spirit and scope of the invention.

I claim:

1. A high speed AC failure detector circuit for detecting an AC power failure and producing an output signal upon the occurrence of such failure, said failure detector circuit comprising integrator circuit means having an input and an output connected to the input in a manner whereby there is a 180° phase shift between the input and the output;

signal input means connected to the input of the integrator circuit means;

potentiometer means connected between the input and the output of the integrator circuit means whereby when a continuous AC signal is supplied to the signal input means the resultant signal at the potentiometer means is zero due to the 180° phase shift between the input and the output of the integrator circuit means and when a discontinuity appears in an AC signal supplied to the signal input means the resultant signal at the potentiometer means is a sine wave; and output means connected to the potentiometer means for failing to produce an output signal when the resultant signal at the potentiometer means is zero and for producing an output signal when the resultant signal at the potentiometer means is other than zero.

2. A high speed AC failure detector circuit as claimed in claim 1, wherein the integrator circuit means comprises first and second integrators each having an input and an output, the output of the first integrator being connected to the input of the second integrator and wherein the potentiometer means is connected between the input of the first integrator and the output of the second integrator.

3. A high speed AC failure detector circuit as claimed in claim 2, wherein each of the first and second integrators comprises an operational amplifier.

4. A high speed AC failure detector circuit as claimed in claim 2, wherein the output means comprises amplifier means having an input connected to the potentiometer means and an output and a pulse circuit connected to the output of the amplifier means whereby when the resultant signal at the potentiometer means is other than zero the amplifier means produces an output signal pulse of either polarity and the pulse circuit converts the output signal pulse to a positive pulse of a predetermined level.

5. A high speed AC failure detector circuit as claimed in claim 4, wherein the amplifier means comprises an operational amplifier.

6. A high speed AC failure detector circuit as claimed in claim 4, wherein the potentiometer means comprises a variable resistor having one end connected to the input of the first integrator and another end connected to the output of the second integrator, the variable resistor having a movable contact tap connected to the input of the amplifier means.

7. A high speed AC failure detector circuit as claimed in claim 6, further comprising a Schmitt trigger circuit having an input connected to the output of the amplifier means and an output for converting the positive pulses produced by the amplifier means to square wave pulses.

* * * * *